(12) United States Patent
Lu et al.

(10) Patent No.: US 10,474,291 B2
(45) Date of Patent: Nov. 12, 2019

(54) DRIVING DEVICE AND DEVICE METHOD

(71) Applicant: Industrial Technology Research Institute, Hsinchu (TW)

(72) Inventors: Yi-Chuan Lu, Kinmen County (TW); Heng-Yin Chen, Hsinchu County (TW); Chang-Po Chao, Taipei (TW); Guan-Jung Luo, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 114 days.

(21) Appl. No.: 15/484,119

(22) Filed: Apr. 10, 2017

(65) Prior Publication Data

US 2018/0181258 A1 Jun. 28, 2018

(30) Foreign Application Priority Data

Dec. 28, 2016 (TW) .............................. 105143503 A

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04102* (2013.01)

(58) Field of Classification Search
CPC ........ G06F 15/00; G06F 3/044; G06F 3/0418; G06F 3/0412; G06F 2203/04102
See application file for complete search history.

(56) References Cited

U.S. PATENT DOCUMENTS 9,235,280 B1 * 1/2016 Mohindra ............. G06F 3/0416
2011/0153263 A1 * 6/2011 Oda ..................... G06F 3/03545
702/150

(Continued)

FOREIGN PATENT DOCUMENTS

CN 102597933 7/2012
TW 201232375 8/2012

(Continued)

OTHER PUBLICATIONS

"Office Action of Taiwan Counterpart Application," dated Aug. 15, 2017, p. 1-p. 8, in which the listed references were cited.

(Continued)

*Primary Examiner* — Priyank J Shah
(74) *Attorney, Agent, or Firm* — JCIPRNET

(57) ABSTRACT

The present disclosure provides a driving device for driving a sensing device having a plurality of driving electrodes and a plurality of sensing electrodes. The driving device includes a signal processing circuit and a readout circuit. The signal processing circuit is electrically connected to the plurality of driving electrodes of the sensing device. The signal processing circuit is configured to generate a plurality of driving signal to drive the sensing device. The signal processing circuit selects a plurality of Walsh codes from a plurality of rows or columns of a Walsh matrix to serve as a plurality of driving signals. The readout circuit readouts the sensing device to generate a plurality of sensing signals and provides the plurality of sensing signals to the signal processing circuit, so that the signal processing circuit demodulates the plurality of sensing signals. In addition, a driving method is also provided.

16 Claims, 6 Drawing Sheets

(56) References Cited

U.S. PATENT DOCUMENTS

2014/0035874 A1* 2/2014 Iizuka ................ G06F 3/0416
345/174
2015/0205408 A1 7/2015 Tsai et al.
2017/0153767 A1* 6/2017 Citta .................. G06F 3/0418

FOREIGN PATENT DOCUMENTS

| TW | 201415037 | 4/2014 |
| --- | --- | --- |
| TW | 201415307 | 4/2014 |
| TW | 201530375 | 8/2015 |
| TW | 201543276 | 11/2015 |
| TW | I507958 | 11/2015 |
| TW | 201624250 | 7/2016 |

OTHER PUBLICATIONS

Shin et al., "A 55dB SNR with 240Hz Frame Scan Rate Mutual Capacitor 30×24 Touch-Screen Panel Read-Out IC Using Code-Division Multiple Sensing Technique", 2013 IEEE International Solid-State Circuits Conference, Feb. 20, 2013, pp. 388-389.
Yi-Chuan Lu et al., "Touch Control Apparatus and Noise Compensating Circuit and Method Thereof", Unpublished U.S. Appl. No. 14/983,584, filed Dec. 30, 2015.

* cited by examiner $$W(8) = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \begin{matrix} \to \text{Tx1} \\ \to \text{Tx2} \\ \to \text{Tx3} \\ \to \text{Tx4} \\ \to \text{Tx5} \\ \to \text{Tx6} \\ \to \text{Tx7} \\ \to \text{Tx8} \end{matrix}$$

FIG. 2

$$W(4) = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{matrix} \to \text{Tx1} \\ \to \text{Tx2} \\ \to \text{Tx3} \\ \to \text{Tx4} \end{matrix}$$

$$W(4) = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{matrix} \to \text{Tx5} \\ \to \text{Tx6} \\ \to \text{Tx7} \\ \to \text{Tx8} \end{matrix}$$

FIG. 3

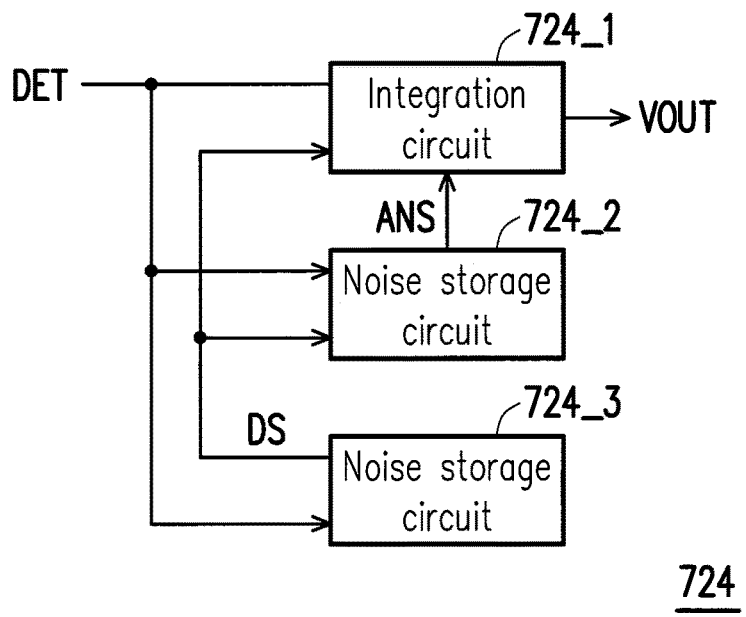

FIG. 8

| Generating a plurality of driving signals by the signal processing circuit to drive the sensing device, wherein the signal processing circuit selects a plurality of Walsh codes from a plurality of rows or a plurality of columns of a Walsh matrix to serve as the plurality of driving signals | ~S910 |

| Readout the sensing device by the readout circuit to generate a plurality of sensing signals, and providing the plurality of sensing signals to the signal processing circuit | ~S920 |

| Demodulating the plurality of sensing signals by the signal processing circuit | ~S930 |

FIG. 9

DRIVING DEVICE AND DEVICE METHOD

CROSS-REFERENCE TO RELATED APPLICATION

This application claims the priority benefit of Taiwan application serial no. 105143503, filed on Dec. 28, 2016. The entirety of the above-mentioned patent application is hereby incorporated by reference herein and made a part of this specification.

BACKGROUND OF THE DISCLOSURE

Field of the Disclosure

The disclosure relates to a driving technique, and particularly relates to a driving device used for driving a sensing device and a driving method.

Description of Related Art

Along with development of technology, electronic products have become necessary tools in people's life. In order to provide a user-friendly user interface, it is a necessary trend to provide a touch display panel with a touch function to the electronic products.

In today's technical field, the touch panels are divided into plug-in type and non-plug-in type touch panels, where the non-plug-in type touch panels can be divided into on-cell type and in-cell type touch panels, and the on-cell type touch panel is to set driving electrodes and sensing electrodes of the touch panel on a surface of a display panel.

The in-cell type touch panel is to directly set a touch sensor in a structure of a display. In the technique of the on-cell type touch panel, the touch panel is liable to be interfered by noises of the lower panel display to cause a detection error of a touch point, especially when a thickness of a touch display panel (for example, an active matrix organic light emitting diode (AMOLED) display panel combined with a touch panel) becomes thinner and thinner, for example, to reach a level below 100 μm, an influence of upper electrodes of the AMOLED display panel on a sensing electric field is more and more obvious, such that poor sensing situation is often occurred. Moreover, sensitivity of the touch sensing of the on-cell type touch panel is decreased due to increase of a capacitance value of a self-capacitance to cause reduction of a ratio between a mutual capacitance and the self-capacitance. Particularly, on a flexible display touch panel, due to an electrical imbalance phenomenon caused by panel bending, detection accuracy of the touch point is further affected.

SUMMARY OF THE DISCLOSURE

The disclosure is directed to a driving device and a driving method, where a plurality of Walsh codes is obtained from a Walsh matrix to serve as driving signals to drive a sensing device, by which a noise interference of signals on a transmission path of the sensing device is effectively eliminated or decreased, so as to improve a signal to noise ratio (SNR) of a readout circuit for readout a sensing signal generated by the sensing device.

The disclosure provides a driving device for driving a sensing device having a plurality of driving electrodes and a plurality of sensing electrodes. The driving device includes a signal processing circuit and a readout circuit. The signal processing circuit is electrically connected to the plurality of driving electrodes of the sensing device. The signal processing circuit is configured to generate a plurality of driving signals to drive the sensing device. The signal processing circuit selects a plurality of Walsh codes from a plurality of rows or columns of a Walsh matrix to serve as the plurality of driving signals. The readout circuit is electrically connected to the plurality of sensing electrodes of the sensing device. The readout circuit is configured to readout the sensing device to generate a plurality of sensing signals and provide the plurality of sensing signals to the signal processing circuit, so that the signal processing circuit demodulates the plurality of sensing signals.

The disclosure provides a driving method adapted to a driving device for driving a sensing device. The driving device includes a signal processing circuit and a readout circuit. The driving method includes following steps. A plurality of driving signals is generated by the signal processing circuit to drive the sensing device, and the signal processing circuit selects a plurality of Walsh codes from a plurality of rows or columns of a Walsh matrix to serve as the plurality of driving signals. The sensing device is readout by the readout circuit to generate a plurality of sensing signals, and the plurality of sensing signals are provided to the signal processing circuit. The plurality of sensing signals are demodulated by the signal processing circuit.

According to the above description, the driving device and the driving method of the disclosure may take a plurality of Walsh codes orthogonal to each other to serve as the driving signals to drive the sensing device. Therefore, the noise interference between the sensing signals generated by a sensing result of the sensing device can be effectively decreased. In this way, the signal processing circuit demodulates the sensing signals to obtain an accurate sensing result.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 is a schematic diagram of a Walsh matrix according to an embodiment of the disclosure.

FIG. 3 is a schematic diagram of a plurality of order-reduced matrices obtained through order reduction of the Walsh matrix according to an embodiment of the disclosure.

FIG. 8 is a schematic diagram of a noise compensation circuit of the embodiment of FIG. 7.

FIG. 9 is a flowchart illustrating a driving method according to an embodiment of the disclosure.

DESCRIPTION OF EMBODIMENTS

A plurality of embodiments is provided below to describe the disclosure, though the disclosure is not limited to the provided embodiments, and the provided embodiments can be suitably combined. A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, a term "signal" refers to at least a current, a voltage, a charge, a temperature, data, an electromagnetic wave or any other one or more signals.

Figure 1:
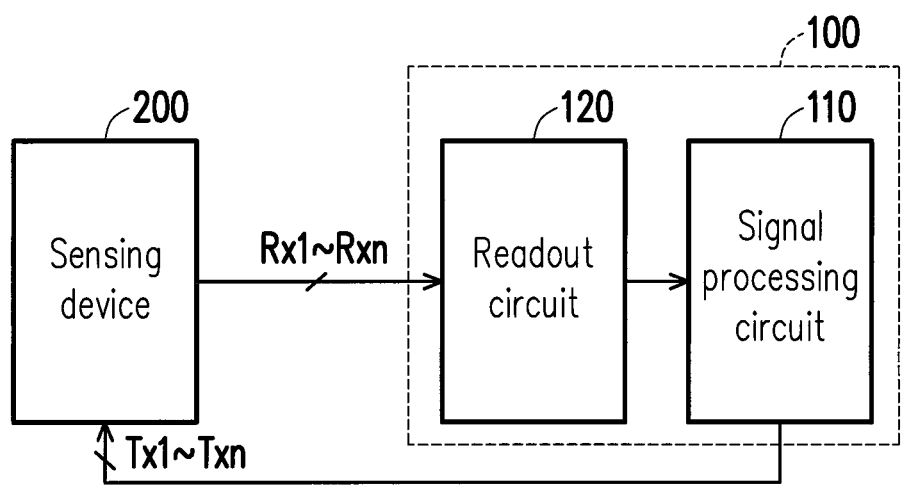
FIG. 1 is a schematic diagram of a driving device according to an embodiment of the disclosure.

FIG. 1 is a schematic diagram of a driving device according to an embodiment of the disclosure. Referring to FIG. 1, the driving device 100 includes a signal processing circuit 110 and a readout circuit 120. In the present embodiment, the driving device 100 is used for driving a sensing device 200. The sensing device 200 has a plurality of driving electrodes Tx1-Txn and a plurality of sensing electrodes Rx1-Rxn, where n is a positive integer greater than 0. In the present embodiment, the signal processing circuit 110 is electrically connected to the plurality of driving electrodes Tx1-Txn of the sensing device 200, and is configured to generate a plurality of driving signals to drive the sensing device 200. The readout circuit 120 is electrically connected to the plurality of sensing electrodes Rx1-Rxn of the sensing device 200. The readout circuit 120 is configured to readout the sensing device 200 to generate a plurality of sensing signals. The readout circuit 120 provides the plurality of sensing signals to the signal processing circuit 110, so that the signal processing circuit 110 demodulates the plurality of sensing signals.

In the present embodiment, the sensing device 200 can be an on-cell touch panel, particularly a flexible touch panel or an active matrix organic light emitting diode (AMOLED), etc., or the sensing device 200 can also be a biosensor or a force sensor, which is not limited by the disclosure. In the present embodiment, the driving device 100 is adapted to drive various sensing device or touch device having a plurality of the driving electrodes Tx1-Txn and a plurality of the sensing electrodes Rx1-Rxn. However, to facilitate those skilled in the art to fully understand technical content and effects of the driving device and the driving method of the disclosure, the sensing device of the following embodiment implemented by a touch panel is described below.

In the present embodiment, the signal processing circuit 110 is a field programmable gate array (FPGA), and the signal processing circuit 110 can be used for implementing a logic gate digital circuit or a complicated combinational logic functions, for example, a decoder, etc., though the disclosure is not limited thereto, and in an embodiment, the signal processing circuit 110 can also be a programmable general purpose or special purpose microprocessor, a digital signal processor (DSP), a programmable controller, an application specific integrated circuits (ASIC), a programmable logic device (PLD) or other similar devices or a combination of the devices. Moreover, the signal processing circuit 110 may further include a memory unit, for example, a random access memory (RAM), a read-only memory (ROM) or a flash memory, etc., and is configured to execute an orthogonal matrix computing operation, a coding/decoding computing operation and related algorithms, etc., mentioned in each of the embodiments of the disclosure.

In the present embodiment, the signal processing circuit 110 adopts a code division multiple sensing (CDMS) method to drive the sensing device 200. The signal processing circuit 110 selects a plurality of Walsh codes from a plurality of rows or columns of a Walsh matrix to serve as a plurality of driving signals, and outputs the driving signals to the sensing device 200 to drive the sensing device 200. The Walsh codes belong to orthogonal spread codes. Namely, since the Walsh codes are orthogonal to each other, the noises between a plurality of sensing signals readout from the sensing device 200 are not mutually interfered. Even if an electromagnetic interference (EMI) may simultaneously influence the whole sensing device 200, since the signal processing circuit 110 may regard the sensing signals as a synthesis of various basic vectors when demodulating the sensing signals, the EMI influence on each transmission path from the driving electrodes to the sensing electrodes in the sensing device 200 can be decreased, so as to effectively improve a report rate of the sensing device 200.

In the present embodiment, when the signal processing circuit 110 receives the sensing signals provided by the readout circuit 120, the signal processing circuit 110 respectively inner products the sensing signals to the corresponding plurality of Walsh codes, so as to demodulate the sensing signals. To be specific, the driving device 100 of the present embodiment outputs a plurality of driving signals with the Walsh codes to the sensing device 200, and the sensing device 200 outputs a plurality of sensing signals according to a sensing result. Then, based on a Walsh transform method, the signal processing circuit 110 of the present embodiment performs an inner product computation on the corresponding orthogonal spread codes and the sensing signals to demodulate the sensing signal. Finally, the signal processing circuit 110 may analyze data of the demodulated sensing signal to obtain the sensing result of the sensing device 200.

Figure 4:
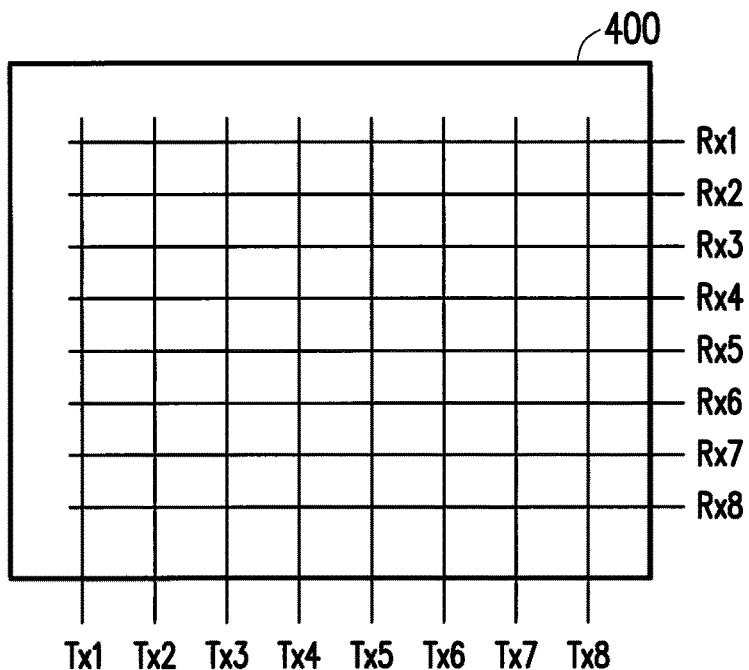
FIG. 4 is a schematic diagram of a touch panel according to an embodiment of the disclosure.

FIG. 2 is a schematic diagram of a Walsh matrix according to an embodiment of the disclosure. FIG. 3 is a schematic diagram of a plurality of order-reduced matrices obtained through order reduction of the Walsh matrix according to an embodiment of the disclosure. FIG. 4 is a schematic diagram of a touch panel according to an embodiment of the disclosure. Referring to FIG. 2 and FIG. 4, the Walsh matrix of each of the embodiments of the disclosure is as that shown in FIG. 2. For example, the sensing device of the disclosure is, for example, a touch panel 400 of an 8×8 array, and includes 8 driving electrodes Tx1-Tx8 and 8 sensing electrodes Rx1-Rx8. Therefore, the signal processing circuit 110 may obtain 8 Walsh codes orthogonal to each other to respectively serve as 8 driving signals according to a plurality of rows or a plurality of columns of an 8-order Walsh matrix W(8), and respectively outputs the 8 driving signals to the sensing device 200 through the 8 driving electrodes Tx1-Tx8, so as to drive the sensing device 200. It should be noted that a bit number of each of the 8 driving signals in one time period is equal to the order number of the Walsh matrix. For example, the driving signal received by the driving electrode Tx3 can be Walsh codes [1, 1, −1, −1, −1, −1, 1, 1] in the Walsh matrix, so that the bit number of the driving signal received by the driving electrode Tx3 within one time period is 8 bits.

It should be noted that in order to improve an anti-noise capability of the touch panel 400, in an embodiment, the signal processing circuit 110 may drive the touch panel 400 according to a time-division driving method. The signal processing circuit 110 may drive the odd number driving electrodes Tx1, Tx3, Tx5, Tx7 and the even number driving electrodes Tx2, Tx4, Tx6 and Tx8 in time-division, so as to decrease a crosstalk interference produced when a plurality of channels is simultaneously driven, though the disclosure is not limited thereto. In other embodiments, the signal processing circuit may also group the driving electrodes Tx1-Tx8 into a plurality of driving electrode groups, and drive the driving electrode groups at different time, for example, the driving electrodes Tx1-Tx4 are in one group, and the driving electrodes Tx5-Tx8 are in one group.

FIG. 3 is a schematic diagram of a plurality of order-reduced matrices obtained through order reduction of the Walsh matrix according to an embodiment of the disclosure. Referring to FIG. 3 and FIG. 4, based on the above concept of time-division driving, the signal processing circuit 110 requires a longer time to provide one set of the driving signals to the touch panel 400. For example, the bit number of one driving signal of FIG. 2 within one time period is 8 bits, and if the signal processing circuit 110 drives the odd number driving electrodes Tx1, Tx3, Tx5, Tx7 and the even number driving electrodes Tx2, Tx4, Tx6 and Tx8 in time-division, a clock number of the touch panel 400 in one frame is 16 clocks. Comparatively, in case that the driving electrodes are simultaneously driven, the clock number of the touch panel 400 in one frame is 8 clocks. Namely, the aforementioned concept of time-division driving may cause reduction of a frame rate of the touch panel 400. Therefore, the Walsh matrix W(8) of FIG. 2 can be transformed into two order-reduced matrices W(4) of FIG. 3 through order reduction. In the present embodiment, the signal processing circuit 110 may select the Walsh codes from a plurality of rows or columns of the two order-reduced matrices W(4) obtained through order reduction of the Walsh matrix W(8) to serve as the driving signals. In this way, when the signal processing circuit 110 drives the touch panel 400 in time-division, the bit number of one driving signal of FIG. 3 within one time period is 4 bits, and if the signal processing circuit 110 drives the odd number driving electrodes Tx1, Tx3, Tx5, Tx7 and the even number driving electrodes Tx2, Tx4, Tx6 and Tx8 in time-division, the clock number of the touch panel 400 in one frame is 8 clocks. Namely, the frame rate of the touch panel 400 is not decreased as the signal processing circuit 110 drives the touch panel 400 in time-division through the order-reduced spread codes. Moreover, in the present embodiment, a length of driving signal receivable by the driving electrodes Tx1-Tx8 in a total time period is equal to a sum of the order numbers of the two order-reduced matrices W(4). In other words, the bit number of the plurality of driving electrodes Tx1-Tx8 in a total time period is 8 bits, and equal to a sum of the order numbers of the two order-reduced matrices W(4).

However, the signal processing circuit 110 of the present embodiment is not limited to select the Walsh codes from the Walsh matrix of FIG. 2 or the order-reduced matrices W(4) of FIG. 3 to serve as the driving signals. In an embodiment, the signal processing circuit 110 may also take the Walsh codes from a Walsh matrix with an ordinal ordering such as a Paley ordering or a Hadamard ordering, etc., to serve as the driving signals. Moreover, in case of the aforementioned time-division driving, the signal processing circuit 110 may dynamically adjust a number of times of the order reduction of the order-reduced matrices, so as to obtain a better driving method. Referring to a following table 1, for example, if the number of the driving electrodes is 28, the signal processing circuit 110 may obtain the driving signals according to one 32-order Walsh matrix, and the clock number required by the sensing device in one frame is 32 clocks. Similarly, two order-reduced matrices of the 16-order Walsh matrix and four order-reduced matrices of the 8-order Walsh matrix are the same. However, the number of the order-reduced matrices of the 4-order Walsh matrix is 10, so that the clock number required by the sensing device in one frame is 40 clocks. Namely, although 10 order-reduced matrices of the 4-order Walsh matrix may effectively decrease the cross-talk interference between the signals (namely, the SNR is the minimum), a larger clock number of one frame is required. Therefore, the optimal driving method is to select four order-reduced matrices of the 8-order Walsh matrix. In this way, the signal driving circuit of the present embodiment may dynamically adjust a magnitude of the Walsh matrix to balance the SNR and the frame rate.

TABLE 1

| | Walsh matrix | | | |
| --- | --- | --- | --- | --- |
| | W(32) | W(16) | W(8) | W(4) |
| Clock number required by one frame (CLOCK) | 32 | 32 | 32 | 40 |

Figure 5:
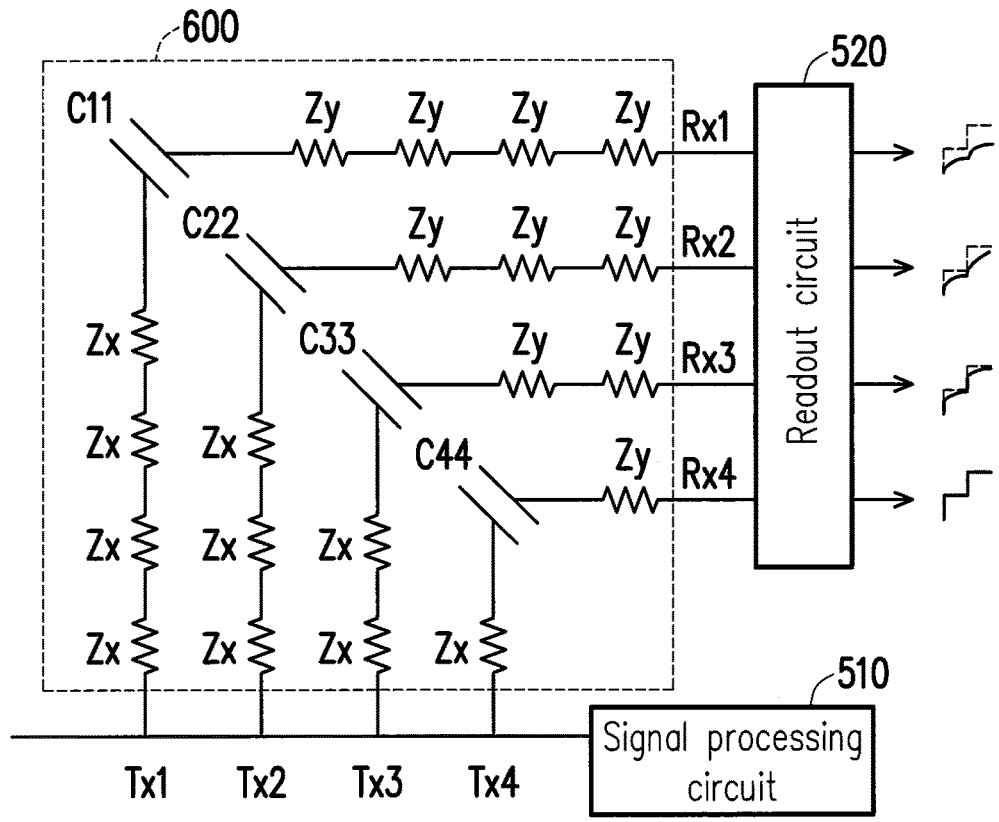
FIG. 5 is a schematic diagram illustrating partial circuits of a sensing device and a driving device according to an embodiment of the disclosure.
Figure 6:
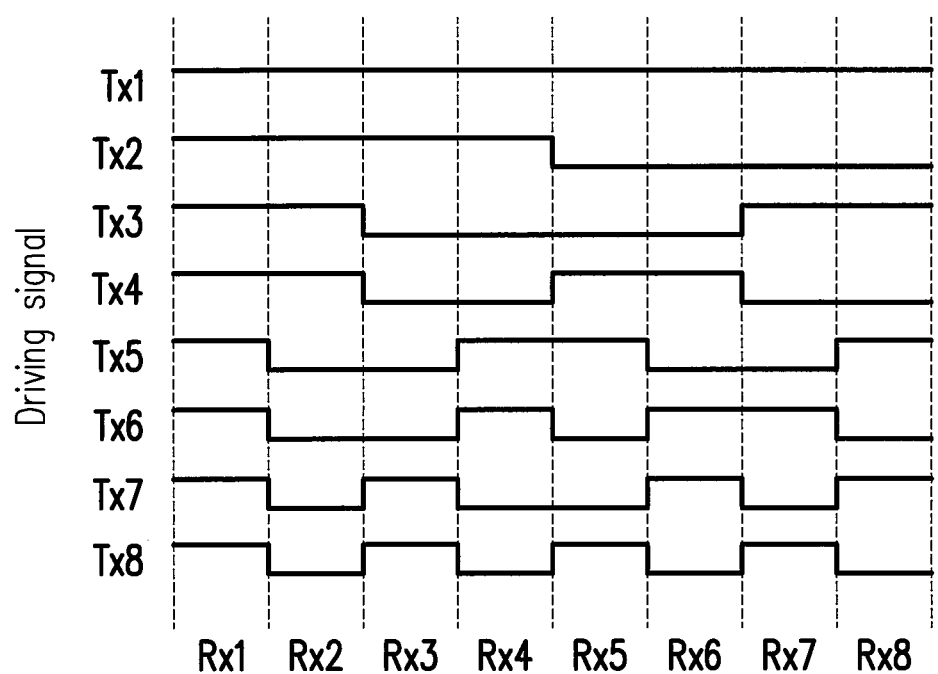
FIG. 6 is a schematic diagram of driving signals according to another embodiment of the disclosure.

FIG. 5 is a schematic diagram illustrating partial circuits of the sensing device and the driving device according to an embodiment of the disclosure. FIG. 6 is a schematic diagram of driving signals according to another embodiment of the disclosure. Referring to FIG. 5 and FIG. 6, the sensing device 600 is electrically connected to a signal processing circuit 510 and a readout circuit 520. In the present embodiment, the sensing device 600 may include a plurality of sensing capacitors C11, C22, C33 and C44. The driving electrodes Tx1-Tx4 of the sensing device 600 are electrically connected to the sensing electrodes Rx1-Rx4 respectively through the sensing capacitors C11, C22, C33 and C44. Therefore, there are transmission paths of different distances for signal transmission of the sensing capacitors C11, C22, C33 and C44, and there are different equivalent impedances Zx, Zy on the transmission paths. Namely, the farther the distance between the driving electrodes Tx1-Tx4 and the sensing electrode Rx1-Rx4 is, the more the sensing signals obtained by the sensing electrodes Rx1-Rx4 are delayed in signal reception due to RC delay. Therefore, in the present embodiment, the driving electrodes Tx1-Tx4 can be configured to determine transition times of the driving signals according to the distances of the transmission paths.

For example, the driving electrode Tx1-Tx4 may receive the driving signals as shown in FIG. 6, where the transition time of the driving electrode Tx1 is 0, the transition time of the driving electrode Tx2 is 1, the transition times of the driving electrode Tx3 are 2, and the transition times of the driving electrode Tx4 are 3. Therefore, a frequency of the driving signal of the driving electrode Tx4 is the highest, and a frequency of the driving signal of the driving electrode Tx1 is the lowest. Therefore, if the driving electrode Tx4 closer to a receiving end receives the driving signal with more transition times (i.e. the frequency thereof is higher), the influence of signal delay of the sensing capacitor C44 received by the sensing electrode Rx4 is lower. Comparatively, if the driving electrode Tx1 located far away from the receiving end receives the driving signal with less transition times (i.e. the frequency thereof is lower), the influence of signal delay of the sensing capacitor C11 received by the sensing electrode Rx1 is higher. However, since the transition times (or frequency) of the driving signal is lower, the influence of signal delay is not obvious. Therefore, based on the aforementioned driving signal configuration method, a problem of signal non-synchronization is effectively mitigated.

Besides that the driving device of the disclosure may select the orthogonal spread codes of the rows or columns (orthogonal vectors) in the orthogonal matrix to serve as the driving signals, so as to reduce the SNR of the sensing signals received by the signal processing circuit, the driving device of the disclosure may also decrease the noise influence in a hardware circuit manner through a design of the readout circuit. Therefore, an exemplary embodiment of a readout circuit is described below with reference of FIGS. 7-8, though the readout circuit of the disclosure is not limited thereto.

Figure 7:
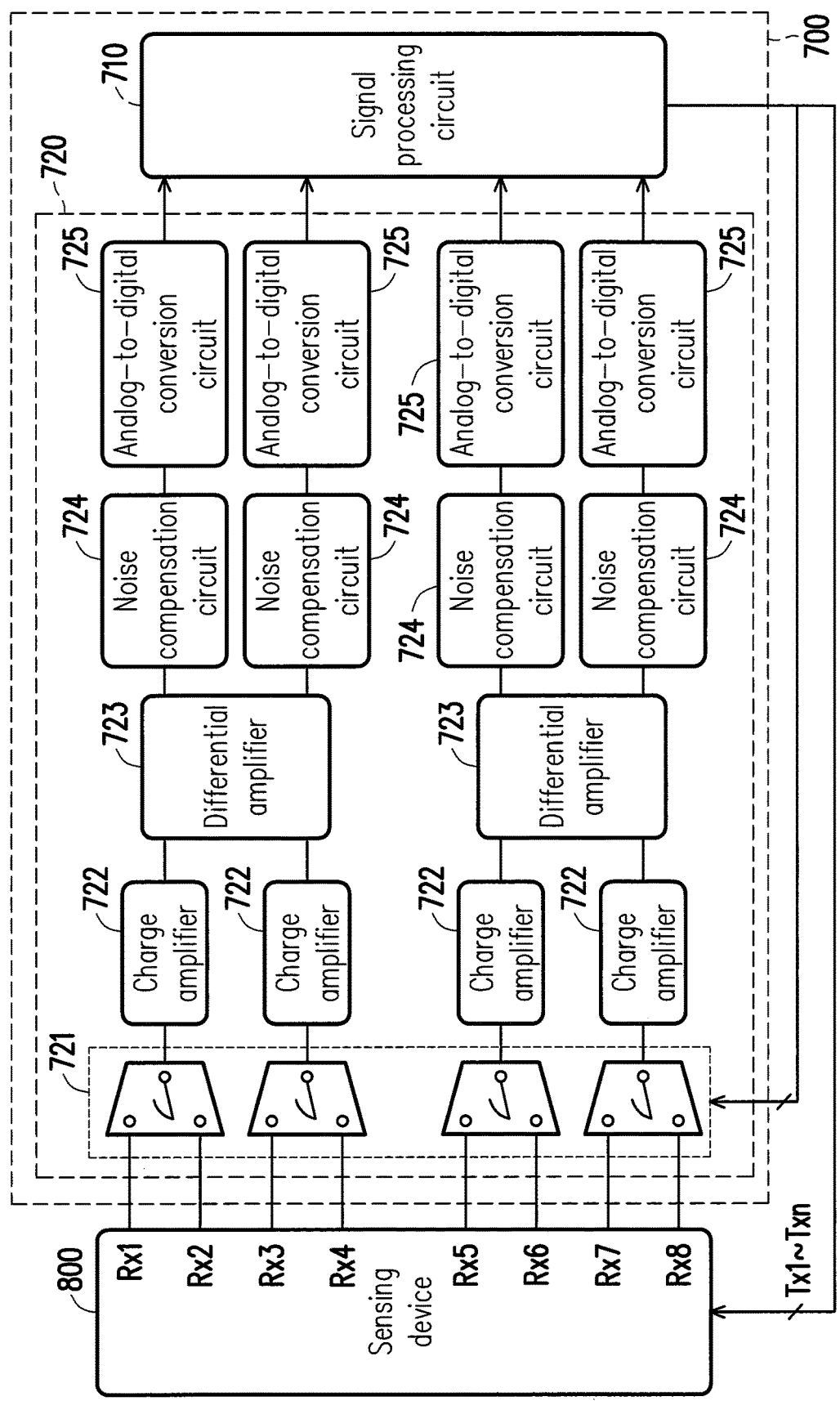
FIG. 7 is a schematic diagram of a driving device according to another embodiment of the disclosure.

FIG. 7 is a schematic diagram of a driving device according to another embodiment of the disclosure. Referring to FIG. 7, the driving device 700 includes a signal processing circuit 710 and a readout circuit 720. The signal processing circuit 710 is electrically connected to the driving electrodes Tx1-Tx8 of the sensing device 800, so as to drive the sensing device 800. The readout circuit 720 is electrically connected to the sensing electrodes Rx1-Rx8 of the sensing device 800 to readout a sensing result of the sensing device 800. In the present embodiment, the readout circuit 720 may include a multiplexer circuit 721, a plurality of charge amplifiers 722, a plurality of differential amplifiers 723, a plurality of noise compensation circuits 724 and a plurality of analog-to-digital conversion circuits 725.

In the present embodiment, the multiplexer circuit 721 may include a plurality of multiplexer circuits to receive analog signals of the sensing result output by the sensing electrodes Rx1-Rx8 in time-division, so as to decrease the cross-talk interference generated when a plurality of channels simultaneously receives signals. The charge amplifiers 722 are configured to amplify the analog signals of the sensing result and provide the same to the differential amplifiers 723. In the present embodiment, the differential amplifiers 723 are configured to eliminate a common mode noise of the analog signals. Then, the noise compensation circuits 724 output the analog signals to the analog-to-digital conversion circuits 725. In the present embodiments, the noise compensation circuits 724 are configured to decrease the noise interference of the analog signals. Finally, the analog-to-digital conversion circuits 725 convert the analog signals into the sensing signals of the digital format, and output the same to the signal processing circuit 710. However, the readout circuit 720 shown in FIG. 7 is only an exemplary embodiment, and the disclosure is not limited thereto. The circuit features of the readout circuit 720 can be designed according to a type of the corresponding sensing device 800.

FIG. 8 is a schematic diagram of a noise compensation circuit of the embodiment of FIG. 7. Referring to FIG. 8, the noise compensation circuit 724 may include an integration circuit 724_1, a noise storage circuit 724_2 and a noise detection circuit 724_3. The noise storage circuit 724_2 is electrically connected to the integration circuit 724_1, and the noise detection circuit 724_3 is electrically connected to the integration circuit 724_1 and the noise storage circuit 724_2. The integration circuit 724_1, the noise storage circuit 724_2 and the noise detection circuit 724_3 all receive an analog signal DET readout from the sensing device, and the noise detection circuit 724_3 compares the analog signal DET with a first threshold and a second threshold, so as to respectively generate a plurality of noise detection results DS. The noise detection circuit 724_3 determines to transmit a plurality of noise signals in the analog signal DET to the noise storage circuit 724_2, or transmit a plurality of valid signals in the analog signal DET to the integration circuit 724_1 according to the generated noise detection results DS, where the first threshold is greater than the second threshold.

The aforementioned first threshold and the second threshold are predetermined values, where when a value of the analog signal DET readout from the sensing device is excessively large (greater than the first threshold) or excessively small (lower than the second threshold), it represents that the analog signal DET is an unreasonable value generated due to the noise interference, and is not adapted to be directly transmitted to the integration circuit 724_1 to calculate a sensing result VOUT. However, the analog signals DET determined to be noise signals probably carry valid touch information that is not suitable for being abandoned, so that in the present embodiment of the disclosure, the noise signals are transmitted to the noise storage circuit 724_2, and the noise storage circuit 724_2 calculates an average noise ANS to serve as a reference for calculating the sensing result VOUT. Namely, in the present embodiment, besides receiving the analog signal DET determined to be the valid signal, the integration circuit 724_1 further receives the average noise ANS. Therefore, the integration circuit 724_1 may generate the sensing result VOUT according to the analog signal DET of the valid signal and the average noise ANS, so as to decrease the influence of the noise on the sensing result.

FIG. 9 is a flowchart illustrating a driving method according to an embodiment of the disclosure. Referring to FIGS. 1 and 9, the driving method of the present embodiment is at least adapted to the driving device 100 of FIG. 1. The driving device 100 is adapted to drive the sensing device 200, and the driving device 100 includes the signal processing circuit 110 and the readout circuit 120. In the present embodiment, the driving device 100 adopts the CDMS method to drive the sensing device 200. The driving method of the present embodiment may include following steps. In step S910, the driving device 100 generates a plurality of driving signals through the signal processing circuit 110 to drive the sensing device 200, and the signal processing circuit 110 selects a plurality of Walsh codes from a plurality of rows or columns of a Walsh matrix to serve as the plurality of driving signals. In step S920, the driving device 100 readouts the sensing device through the readout circuit 120 to generate a plurality of sensing signals, and provides the sensing signals to the signal processing circuit 110. In step S930, the signal processing circuit 110 demodulates the sensing signals. Moreover, the signal processing circuit 110 of the present embodiment may analyze the demodulated result to obtain the sensing result of the sensing device 200. In this way, the driving device 100 of the present embodiment may effectively eliminate or decrease the noise interference between the sensing signals, and effectively resist the influence of the EMI.

In summary, the driving device and the driving method of the disclosure may effectively drive the sensing device, and effectively decrease or eliminate the noises or EMI of the sensing signals provided by the sensing result of the sensing device. The driving device and the driving method of the disclosure mainly take a plurality of Walsh codes obtained from the Walsh matrix as the driving signals to drive the sensing device, such that the EMI influence on each transmission path between the driving electrode and the sensing electrode in the sensing device is decreased, so as to effectively improve a report rate of the sensing device. Moreover, the driving device and the driving method of the disclosure can be combined with a hardware circuit to design a noise compensation circuit in the readout circuit. In this way, the noise or the EMI of the signals can be further eliminated or decreased, so as to improve the SNR of the sensing signals.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A driving device, configured to drive a sensing device having a plurality of driving electrodes and a plurality of sensing electrodes, the driving device comprising:
    a signal processing circuit, electrically connected to the plurality of driving electrodes of the sensing device, and configured to generate a plurality of driving signals to drive the sensing device, wherein the signal processing circuit selects a plurality of Walsh codes from a plurality of rows or a plurality of columns of a plurality of order-reduced matrices obtained through order reduction of a Walsh matrix to serve as the plurality of driving signals, wherein an order number of each of the plurality of order-reduced matrices is less than the Walsh matrix; and
    a readout circuit, electrically connected to the plurality of sensing electrodes of the sensing device, and configured to readout the sensing device to generate a plurality of sensing signals and provide the plurality of sensing signals to the signal processing circuit, so that the signal processing circuit demodulates the plurality of sensing signals,
    wherein a bit number of each of the plurality of driving signals in one time period is equal to the order number of the corresponding plurality of order-reduced matrices, and a bit number of the plurality of driving signals in a total time period is equal to a sum of the order numbers of the plurality of order-reduced matrices.

2. The driving device as claimed in claim 1, wherein the signal processing circuit respectively inner products the plurality of sensing signals to the corresponding plurality of Walsh codes, so as to demodulate the plurality of sensing signals.

3. The driving device as claimed in claim 1, wherein a bit number of each of the plurality of driving signals in one time period is equal to an order number of the Walsh matrix.

4. The driving device as claimed in claim 1, wherein the plurality of driving electrodes are divided into a plurality of driving electrode groups, and the signal processing circuit drives the plurality of driving electrode groups in time-division through the plurality of driving signals.

5. The driving device as claimed in claim 1, wherein the sensing device comprises a plurality of sensing capacitors, and the plurality of driving electrodes, the plurality of sensing electrodes and the plurality of sensing capacitors, wherein plurality of driving electrodes are respectively electrically connected to the plurality of sensing electrodes through the plurality of sensing capacitors to respectively form a plurality of transmission paths of different distances, wherein transition times of each of the plurality of driving signals is determined according to the distance of the corresponding transmission path.

6. The driving device as claimed in claim 1, wherein the readout circuit comprises a multiplexer circuit electrically connected to the plurality of sensing electrodes of the sensing device, and the multiplexer circuit is configured to receive a plurality of analog signals in time-division.

7. The driving device as claimed in claim 1, wherein the readout circuit comprises a plurality of differential amplifiers electrically connected to the plurality of sensing electrodes of the sensing device, the plurality of differential amplifiers receive a plurality of analog signals from the plurality of sensing electrodes, and the plurality of differential amplifiers are configured to eliminate a common mode noise of the plurality of analog signals.

8. The driving device as claimed in claim 1, wherein the readout circuit comprises a plurality of noise compensation circuits, the plurality of noise compensation circuits receive a plurality of analog signals from the plurality of sensing electrodes, and the plurality of noise compensation circuits are configured to reduce a noise interference of the plurality of analog signals.

9. The driving device as claimed in claim 1, wherein the readout circuit comprises a plurality of analog-to-digital conversion circuits electrically connected to the plurality of sensing electrodes of the sensing device, the plurality of analog-to-digital conversion circuits receive a plurality of analog signals from the plurality of sensing electrodes, and convert the plurality of analog signals into the plurality of sensing signals of a digital format.

10. The driving device as claimed in claim 1, wherein the sensing device is a touch panel, a biosensor or a force sensor.

11. A driving method, adapted to a driving device for driving a sensing device having a plurality of driving electrodes and a plurality of sensing electrodes, wherein the driving device comprises a signal processing circuit and a readout circuit, the driving method comprising:
    generating a plurality of driving signals by the signal processing circuit to drive the sensing device, wherein the signal processing circuit selects a plurality of Walsh codes from a plurality of rows or a plurality of columns of a plurality of order-reduced matrices obtained through order reduction of a Walsh matrix to serve as the plurality of driving signals, wherein an order number of each of the plurality of order-reduced matrices is less than the Walsh matrix;
    readout the sensing device by the readout circuit to generate a plurality of sensing signals, and providing the plurality of sensing signals to the signal processing circuit; and
    demodulating the plurality of sensing signals by the signal processing circuit,
    wherein a bit number of each of the plurality of driving signals in one time period is equal to the order number of the corresponding plurality of order-reduced matrices, and a bit number of the plurality of driving signals in a total time period is equal to a sum of the order numbers of the plurality of order-reduced matrices.

12. The driving method as claimed in claim 11, wherein the step of demodulating the plurality of sensing signals by the signal processing circuit comprises:
    respectively inner product the plurality of sensing signals to the corresponding plurality of Walsh codes, so as to demodulate the plurality of sensing signals.

13. The driving method as claimed in claim 11, wherein a bit number of each of the plurality of driving signals in one time period is equal to an order number of the Walsh matrix.

14. The driving method as claimed in claim 11, wherein the plurality of driving electrodes are divided into a plurality of driving electrode groups, and the step of generating the plurality of driving signals by the signal processing circuit to drive the sensing device comprises:

driving the plurality of driving electrode groups in time-division through the plurality of driving signals.

15. The driving method as claimed in claim 11, wherein the step of generating the plurality of driving signals by the signal processing circuit to drive the sensing device comprises:

determining transition times of each of the plurality of driving signals according to a distance of a corresponding transmission path in the sensing device.

16. The driving method as claimed in claim 11, wherein the sensing device is a touch panel, a biosensor or a force sensor.

\* \* \* \* \*